Nov. 4, 1958  J. M. JACKSY  2,858,744
AUTOMATIC BROACH HANDLING MECHANISM
Filed Oct. 14, 1955  2 Sheets-Sheet 1
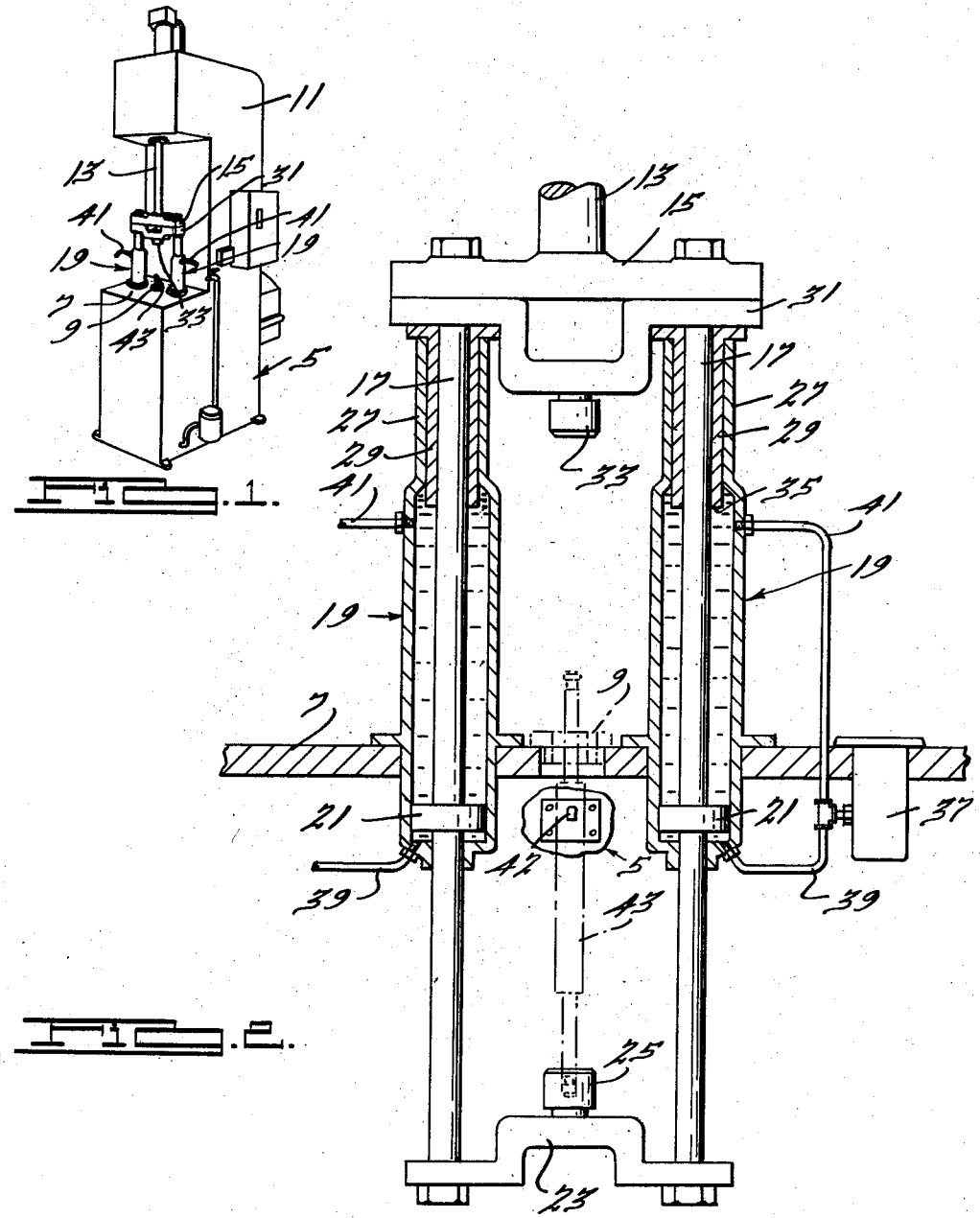
INVENTOR.
John M. Jacksy
BY
Harness, Dickey & Pierce
ATTORNEYS

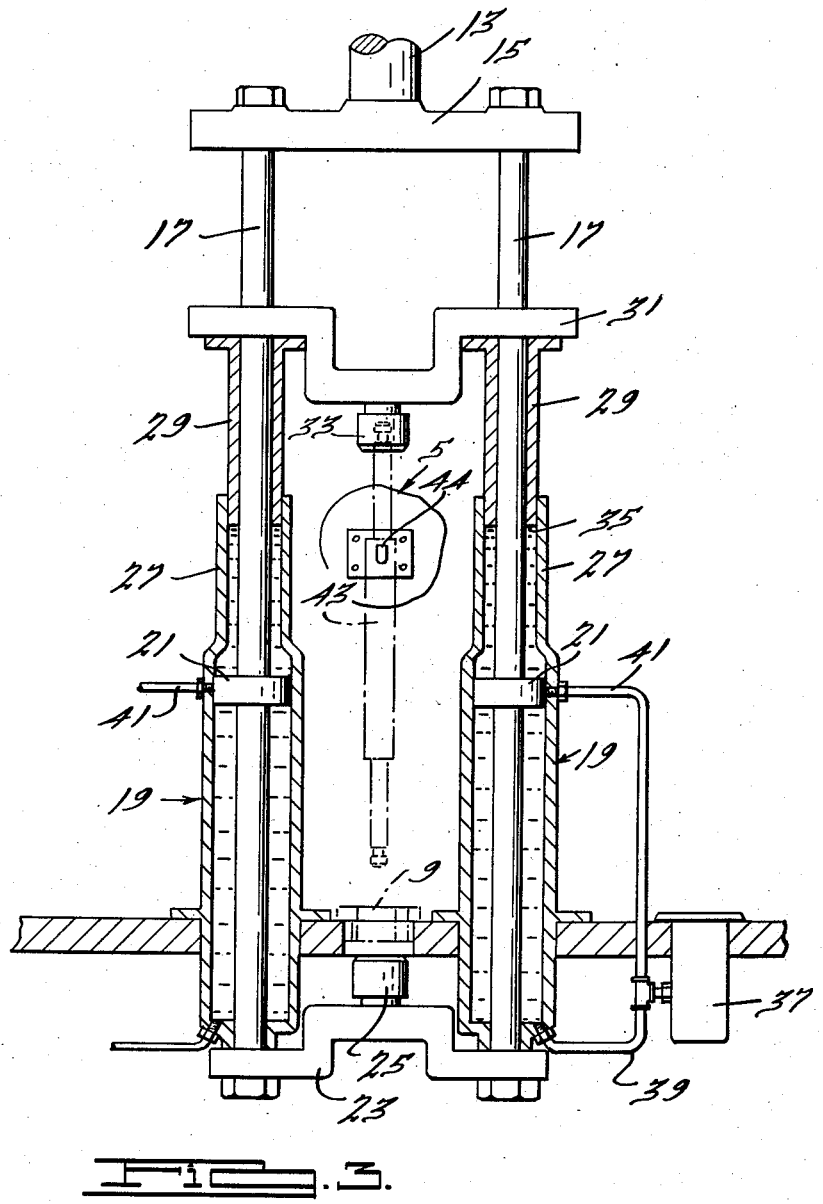

United States Patent Office 2,858,744
Patented Nov. 4, 1958

2,858,744

AUTOMATIC BROACH HANDLING MECHANISM

John M. Jacksy, Detroit, Mich., assignor to Colonial Broach & Machine Company, Detroit, Mich., a corporation of Delaware Application October 14, 1955, Serial No. 540,473

4 Claims. (Cl. 90—33)

This invention relates generally to work mechanisms, and more particularly to a work mechanism, such as a broach handling mechanism, wherein relative movement between two operatively interconnected movable parts is desired.

It is an object of this invention to provide an improved work mechanism wherein one movable member is operatively interconnected with a second movable member so that the members may move together during portions of their movement and so that the second member may move relative to the first member and at a different rate of speed during other portions of their movement.

It is a still further object of this invention to provide a work mechanism of the aforementioned type which is arranged and constructed so as to provide an automatic broach handling mechanism.

It it a still further object of this invention to provide a simplified automatic broach handling mechanism which will not require any special valves or interlocking arrangement with the remainder of the broaching machine, and in which time for handling the broach is reduced.

It is a still further object of this invention to provide a mechanism of the aforementioned type in which the actuation of one member hydraulically actuates the second hydraulic unit so as to obtain the relative movement between two members.

It is a still further object of this invention to provide an improved hydraulic system for use in machine tools or the like which makes maximum efficient use of motion and hydraulic pressures.

These and other objects of this invention will become apparent from the following detailed description taken in conjunction with the accompanying drawing, in which:

Figure 1 is a perspective view of a machine embodying the mechanism of this invention;

Fig. 2 is a longitudinal view, partially in section and partially in elevation, of the mechanism of this invention showing a broach being pulled downwardly through a workpiece; and Fig. 3 is a view similar to Fig. 2 illustrating the mechanism in position when a broach has been pulled upwardly through a workpiece.

While a device of this invention is illustrated and described in connection with broaching equipment, it is to be understood that it has application in other types of equipment, and in machines and for other uses. Furthermore, only one arrangement of the device is illustrated, and it will be understood that this invention is not limited to the specific arrangement illustrated.

As can be best seen in the drawing, a hydraulic press 5 is illustrated as being used to perform broaching operations. The press 5 includes a work platen 7 on which a workpiece 9, to be broached, is positioned. The platen and workpiece have suitable apertures therein so that a broach may pass vertically therethrough. The hydraulic press 5 includes the usual stationary supporting structure 11 in which a ram 13 is movably supported and in which suitable actuating or driving means for the ram 13 is provided. The lower end of the ram 13 is connected with a bracket 15, and a pair of depending rods 17 are connected with the bracket 15. The rods 17 are disposed in spaced apart side-by-side relationship and each of the rods extends through a cylinder 19 which is fixedly supported on the platen 7 in any suitable manner. Intermediate the ends of each rod 17 a bore-fitting piston 21 is provided which is movable in the bore of its respective cylinder 19. The lower end of each rod 17 is connected to a bracket 23 which, in turn, carries a broach engaging chuck 25 of the automatic release type, such as shown in Patent No. 2,338,989, issued to Benedict Welte on January 11, 1944 and entitled "Release Mechanism for Broach Pulling Chucks." The upper portion 27 of each of the cylinders 19 is reduced in diameter and slidably supports a sleeve-like slide member 29. It will, of course, be understood that instead of reducing the diameter of the cylinder, a second cylinder, connected to the main cylinder, could be provided. The upper ends of the slide members 29 are rigidly connected with a bracket 31 which, in turn, carries a depending broach handling chuck 33 which is substantially identical to the chuck 25. The lower ends of the slide members 29 extend downwardly into the enlarged portion of each cylinder, and the rods 17 are slidable in the slide members 29. It should be noted that the end face 35 of each slide member 29 has a lesser area than the upper face area of the piston 21 disposed in the cylinder. A liquid reservoir 37 is supported on the machine supporting structure and communicates with the lower end of each cylinder 19 through a conduit 39. The liquid reservoir 37 communicates with each cylinder 19 just below the reduced upper end portion 27 thereof through conduit 41. It will be noted that each conduit 41 connects with its cylinder a slight distance below the reduced upper end of the cylinder so that as the piston 21 moves upwardly toward the slide member 29, it will close communication between the cylinder 19 and the conduit 41 before reaching the top of the enlarged or main cylinder bore. The cylinders 19 are filled with liquid at all times and communicate with the reservoir so that liquid can circulate between the reservoir and the cylinders.

In the particular embodiment of the invention illustrated, the hydraulic press is being used as a pull-down broaching machine in which the lower chuck 25 engages a broach 43 to pull the same through a workpiece aperture and broach the latter. When the parts are in the position illustrated in Fig. 2, the broach pulling chuck 25 is in its lowermost position having completed the broaching operation on the workpiece 9 and the pistons 21 are disposed adjacent the bottoms of the cylinders 19. The machine operator will then remove the workpiece 9 from the platen 7 and will actuate the machine ram 13 so as to cause the same to move upwardly. Upon the upward movement of the ram 13, the pistons 21, brackets 23 and 15, and chuck 25 will move upwardly to the position illustrated in Fig. 3. The bracket 31, chuck 33, and slide members 29 will remain in the position illustrated in Fig. 2 until piston 21 closes off communication between the cylinder and the conduit 41. The continued upward movement thereafter of the pistons 21 will cause a build-up in liquid pressure which will raise the slide members 29, bracket 31, and chuck 33 to the position illustrated in Fig. 3. This movement of the slide members 29, bracket 31, and chuck 33 will be, in the particular embodiment, at three times the speed of movement of the ram 13 because the area of the lower end faces 35 of the slide members 29 is only one-third the area of the upper faces of the pistons 21. It should be noted that the conduit 41 communicates with the cylinders 19 at a point such that the upper end of the broach 43 will be engaged in the chuck 33 prior to the upward movement of the chuck 33. Likewise, the lower end of the broach will be disengaged from the chuck 25 before the rapid upward movement of the broach handling chuck occurs. In this connection, a stationary abutment 42 is provided to engage chuck 25 and open the same to release the broach, all as described in the aforementioned prior patent. After the parts reach the position illustrated in Fig. 3, the operator inserts a new workpiece 9 on the platen 7 and thereafter the ram 13 is moved downwardly. This downward movement of the ram, and thus of the rods 17 and pistons 21 will cause the slide members 29, bracket 31, and handling chuck 33 to move downwardly to the position illustrated in Fig. 2 at a greater speed of movement than the downward speed of movement of the ram, and in the particular illustrated embodiment, at a speed substantially three times that of the ram speed. This rapid downward movement will cause the lower end of the broach 43 to engage in the broach pulling chuck 25, and the handling chuck will engage abutment 44 and release the broach. Thereafter, the broach pulling chuck 25 will pull the broach 43 downwardly through the workpiece 9. It will, of course, be appreciated that the weight of the slide members 29, bracket 31, and chuck 33 will cause the same to move downwardly when the pistons 21 move downwardly in the cylinder so as to reduce the liquid pressure holding the same in their uppermost position. If the machine were a horizontal type machine rather than a vertical type, suitable springs or other means for causing the slide members and the upper bracket and chuck to move into the cylinders would be provided.

It should be noted that the broach is automatically handled with this mechanism, and that no special valves or interlocks are required between the ram, its actuating mechanism, and the broach handling mechanism, and that the mechanism automatically operates upon movement of the ram. Furthermore, because of the rapid movement of the broach handling chuck, both toward and away from the broach pulling chuck and because the handling is accomplished simultaneously with the movement of the ram, the broach handling time is reduced and faster operating cycles are obtained. Furthermore, it will be noted that it is not necessary to provide special guide ways in this machine because the brackets are guided by the rods and cylinder for movement along their predetermined paths. Thus, the invention provides an improved novel and automatic broach handling mechanism which may be attached to any suitable machine, and which is relatively inexpensive to manufacture and maintain. In certain arrangements, it may be possible to use fluid, such as air, in the cylinders, instead of liquid. This, of course, would only be possible where the compressibility of the fluid would not adversely affect the operation.

What is claimed is:

1. In a work mechanism in which relative movement between two movable members is desired, a supporting structure, a pair of opposed members supported for movement relative to said supporting structure along a predetermined path, means supported by said supporting structure providing a liquid chamber having a bore extending parallel to said predetermined path, a piston movably supported in said chamber bore, a piston rod connected with said piston and projecting beyond at least one end of said chamber with the projecting end thereof connected with one of said movable members, a bore-fitting slide member movably supported in said bore and projecting from the opposite end of said chamber and connected with the other of said movable members, a liquid reservoir, first conduit means communicating said reservoir with said chamber at said one end thereof, and second conduit means connecting said reservoir with said chamber at a point spaced from the opposite end thereof and in a position to be closed off by said piston before said piston reaches the opposite end of said chamber bore, said reservoir and said chamber being adapted to be filled with liquid at all times so that when said piston reaches a predetermined point in its movement toward said slide member said second conduit means will be closed and liquid pressure will act against said slide member to move the same away from said piston and thereby cause said second movable member to move relative to said first movable member, the area of said slide member against which the liquid pressure acts being different than the area of said piston against which the liquid pressure acts so that said relative movement will occur.

2. In a work mechanism, a supporting structure, a first and a second movable member movably supported on said supporting structure, means supported by said supporting structure providing a first liquid chamber having a bore therein, the axis of which is substantially parallel to the direction of movement of said first and second members, a piston movably supported in said chamber bore, a piston rod connected with said piston and projecting beyond at least one end of said chamber and connected with one of said movable members, means providing a second chamber communicating with said first chamber adjacent the opposite end thereof, a piston slidably disposed in said second chamber and connected with said second movable member, a liquid reservoir, first conduit means communicating said liquid reservoir with said one end of said first chamber, and second conduit means communicating said liquid reservoir with said first chamber adjacent the opposite end thereof but spaced from the opposite end of said chamber so that communication between said first chamber and said second conduit means will be interrupted when said piston in said first chamber reaches a predetermined point in its travel, whereby further movement of said piston will cause liquid pressure to act against the piston in said second chamber so as to cause the same to move relative to said second chamber, the cross-sectional area of said second chamber being less than the cross-sectional area of said first chamber so that when said piston closes said second conduit means said second piston will move away from said first chamber piston at a rate of movement greater than the rate of movement of said piston in said first chamber, thereby causing said second member to move away from said first member faster than the rate of movement of said first member, and whereby when said piston moves toward one end of said first chamber said second piston will move toward said piston in said first chamber at a faster rate of movement than said piston in said first chamber moves toward said one end so that said second member will move toward said first member at a faster rate of movement than said first member is moving away from said second member.

3. In a broach handling mechanism, a pair of spaced apart side-by-side cylinders adapted to be connected with a supporting structure of a machine, a piston movably disposed in each of said cylinders, a piston rod connected with each of said pistons and projecting beyond one end of its cylinder, a first movable member connected with the projecting end of each of said piston rods, said first movable member being connectible to a machine ram for movement along a predetermined path, a slide member disposed in the opposite end of each of said cylinders, the inner end face of each of said slide members having a lesser area than the face area of the piston disposed in its cylinder, said slide member projecting beyond the opposite end of said cylinder, a second movable member connected with said slide members, a liquid reservoir, first conduit means connecting said liquid reservoir with said one end of each of said cylinders, and second conduit means communicating said liquid reservoir with each of said cylinders adjacent the inner end of said slide member, said second conduit means adapted to be closed from communication with each of said cylinders when said pistons reach a predetermined point in their travel toward said slide members, whereby thereafter liquid pressure will be built up in said cylinders to cause said slide members to move away from said pistons at a greater rate of speed than the movement of said pistons toward said slide members.

4. In a broaching machine, stationary supporting structure including a platen on which a workpiece may be positioned, a pair of spaced apart side-by-side cylinders supported on said platen, a piston slidably disposed in each of said cylinders, piston rod means connected with said piston and extending beyond opposite ends of said cylinder, bracket means connected with said piston rods beyond opposite ends of said cylinders, a broach pulling chuck carried by one of said brackets on one side of said platen, each of said cylinders on the opposite side of said platen from said broach pulling chuck having a portion which is reduced in diameter with respect to the adjacent cylinder portion, a bore-fitting slide member slidably disposed in each of said reduced cylinder portions, bracket means connected with said slide members, broach handling chuck means carried by said latter bracket, a liquid reservoir, first conduit means connecting said liquid reservoir with the end of said cylinder on the one side of said platen, and second conduit means communicating said liquid reservoir with each of said cylinders adjacent to but spaced from the reduced diameter portion of said cylinder.

References Cited in the file of this patent

UNITED STATES PATENTS

| | | |
|---|---|---|
| 473,472 | Parisher | Apr. 26, 1892 |
| 1,578,925 | Seeger | Mar. 30, 1926 |
| 2,017,999 | West | Oct. 22, 1935 |
| 2,114,276 | Baumbach | Apr. 19, 1938 |
| 2,329,044 | Gollmer | Sept. 7, 1943 |
| 2,505,771 | Hoar | May 2, 1950 |
| 2,669,164 | Ketchpel | Feb. 16, 1954 |
| 2,698,517 | Witt | Jan. 4, 1955 |